United States Patent
Kozloski et al.

(10) Patent No.: US 9,292,635 B2
(45) Date of Patent: **\*Mar. 22, 2016**

(54) SYSTEM AND METHOD FOR COLLABORATIVE VEHICLE CRASH PLANNING AND SEQUENCE DEPLOYMENT

(71) Applicant: INTERNATIONAL BUSINESS MACHINES CORPORATION, Armonk, NY (US)

(72) Inventors: James R. Kozloski, New Fairfield, CT (US); Timothy Michael Lynar, Kew (AU); Clifford Alan Pickover, Yorktown Heights, NY (US); John Michael Wagner, Victoria (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/697,136

(22) Filed: Apr. 27, 2015

(65) Prior Publication Data
US 2015/0242552 A1    Aug. 27, 2015

Related U.S. Application Data

(63) Continuation of application No. 14/189,165, filed on Feb. 25, 2014.

(51) Int. Cl.
   G06F 17/50      (2006.01)
   B60R 21/0132    (2006.01)
   H04L 29/08      (2006.01)
   B60R 21/0134    (2006.01)

(52) U.S. Cl.
   CPC ........ *G06F 17/5009* (2013.01); *B60R 21/0132* (2013.01); *B60R 21/0134* (2013.01); *G06F 17/50* (2013.01); *H04L 67/12* (2013.01)

(58) Field of Classification Search
   CPC .... B60R 21/0132; G06F 17/50; G08G 1/161; G08G 1/162; G08G 1/166; G01S 2013/936
   USPC .......................................................... 701/301
   See application file for complete search history.

(56) References Cited

U.S. PATENT DOCUMENTS

| | | |
|---|---|---|
| 7,565,234 B2 | 7/2009 | Noda et al. |
| 8,831,870 B2 | 9/2014 | Whikehart et al. |
| 9,108,582 B1 * | 8/2015 | Kozloski ............. B60R 21/0132 |
| 2011/0015818 A1 | 1/2011 | Breuer et al. |
| 2011/0022317 A1 | 1/2011 | Okita |
| 2011/0082623 A1 | 4/2011 | Lu et al. |

FOREIGN PATENT DOCUMENTS

| | | |
|---|---|---|
| JP | 2000-207691 | 7/2000 |
| JP | 2005-82124 | 3/2005 |
| JP | 2010-3237 | 1/2010 |

OTHER PUBLICATIONS

Non-Final Office Action for U.S. Appl. No. 14/189,165 mailed on Feb. 4, 2015.

\* cited by examiner

*Primary Examiner* — Richard Camby
(74) *Attorney, Agent, or Firm* — Tutunjian & Bitetto, P.C.; Vazken Alexanian

(57) ABSTRACT

A system and method for collaborative vehicle crash planning employs a model-based approach for mitigating damage and injuries resulting from a vehicle collision. A real-time crash model is generated to determine an optimal crash sequence within a parallel computing environment.

20 Claims, 9 Drawing Sheets

SYSTEM AND METHOD FOR COLLABORATIVE VEHICLE CRASH PLANNING AND SEQUENCE DEPLOYMENT

CROSS-REFERENCE TO RELATED APPLICATIONS

This application is a Continuation application of co-pending U.S. patent application Ser. No. 14/189,165 filed on Feb. 25, 2014, incorporated herein by reference in its entirety.

FIELD OF THE INVENTION

The invention disclosed broadly relates to the field of communication systems, and more particularly relates to the field of onboard communication systems.

BACKGROUND OF THE INVENTION

Vehicle collisions that occur at high rates of speed are deadly, resulting in approximately 43,000 lives lost every year in the United States alone. Costs associated with these vehicle fatalities run approximately $165 billion. The physics of these crashes has been well studied and has dictated many safety features deployed in vehicle design today. These features, however, are static and non-collaborative; they are deployed in the same manner in every car, regardless of the specifics of the high speed crash, and they attempt to optimize the outcome for each automobile without consideration of the outcome for the other vehicle(s).

While the known technology includes evasive and impact minimizing measures deployed upon detection of an imminent crash, we know of no technology that uses a collaborative, model-based approach to optimizing crash outcomes.

SUMMARY OF THE INVENTION

Briefly, according to an embodiment of the present disclosure, a method for collaborative vehicle crash planning employs a model-based approach for mitigating damage and injuries resulting from a vehicle collision. A real-time crash model is generated to determine an optimal crash sequence within a parallel computing environment. The method includes steps or acts of: deriving a likelihood of an impact occurring between a first vehicle and a second vehicle; negotiating a crash modeling protocol between the first and the second vehicle; and determining an optimal crash sequence by performing the following within time step boundaries: exchanging the variable simulation state of each vehicle; collaboratively computing a crash model prior to impact. Next, the computed crash model is exchanged between the vehicles.

According to another embodiment of the present disclosure, an information processing system performs real-time crash modeling by using a processor device to perform the method steps of: deriving a likelihood of an impact occurring between a first vehicle and a second vehicle; negotiating a crash modeling protocol between the first and the second vehicle; and determining an optimal crash sequence by performing the following within time step boundaries: exchanging the variable simulation state of each vehicle; collaboratively computing a crash model prior to impact; and providing the computed crash model.

According to another embodiment of the present disclosure, a computer program product includes a computer-readable storage medium with computer-executable instructions stored thereon. The computer-executable instructions cause the computer to perform real-time crash modeling in anticipation of a collision.

BRIEF DESCRIPTION OF THE SEVERAL VIEWS OF THE DRAWINGS

To describe the foregoing and other exemplary purposes, aspects, and advantages of the present disclosure, we use the following detailed descriptions of exemplary embodiments of the disclosure with reference to the drawings, in which.

Figure 1:
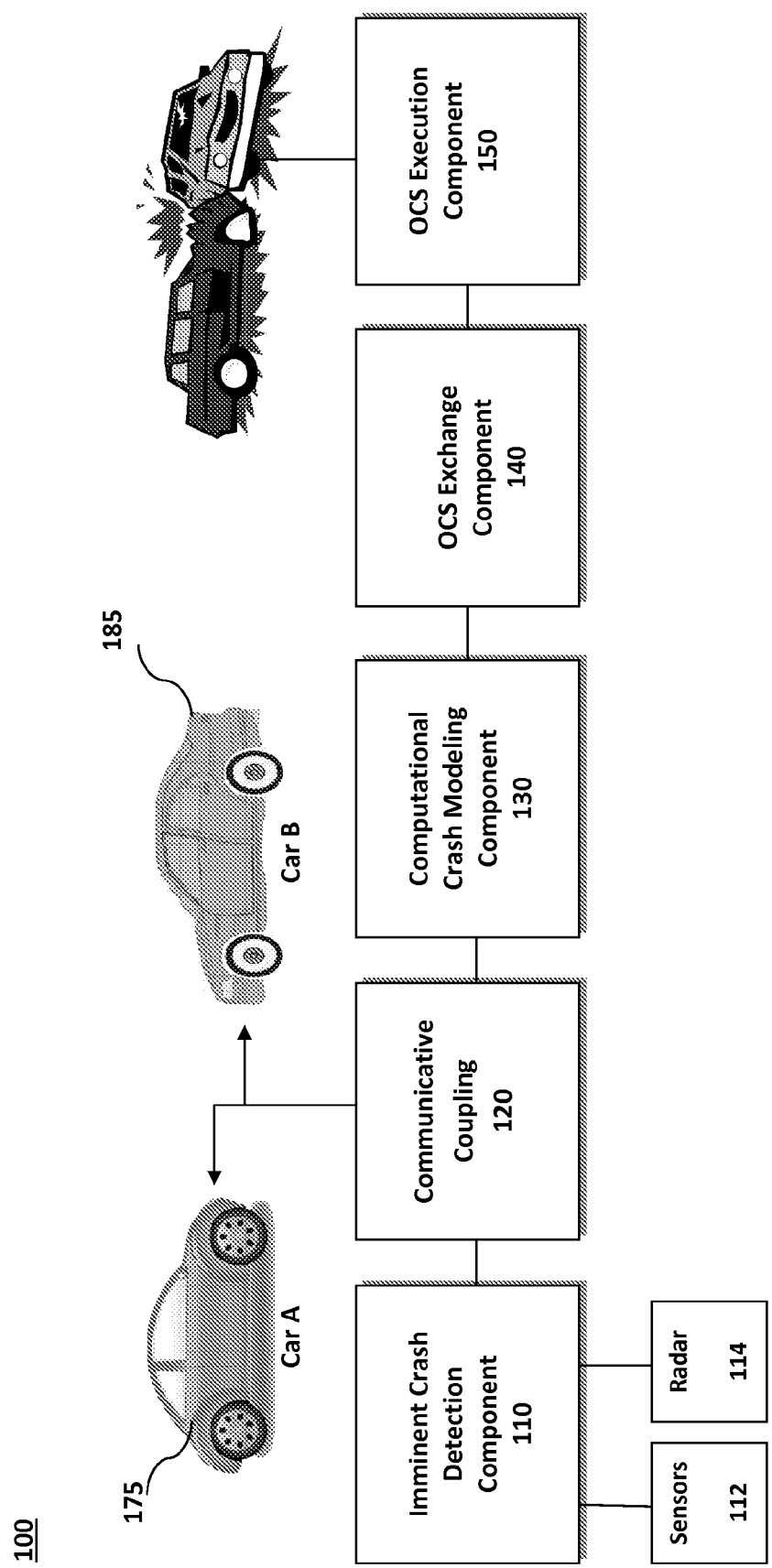
FIG. 1 is a simplified system overview showing the main components of the crash detection system, according to an embodiment of the present disclosure.

While embodiments of the disclosure as claimed can be modified into alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the scope of the present disclosure.

DETAILED DESCRIPTION

Before describing in detail embodiments that are in accordance with the present disclosure, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present disclosure so as not to obscure the discussion with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe embodiments of a collaborative communication system and method to mitigate damage and injuries resulting from a vehicle collision. To this end we employ a dynamic, model-based system for ameliorating the outcome of a high-speed collision between vehicles. In this system, onboard computing facilities in each vehicle exchange and process pertinent information as soon as a high speed vehicle collision is anticipated. This information can include: vehicle type information, passenger information (number of passengers and their locations), and onboard safety features. Unlike safety measures in use today, the information that is exchanged includes data from the other vehicle. Using this information, the onboard computing facilities of each vehicle collaborate to modify a vehicle's behavior in the time between imminent collision detection and vehicle impact. We term this process of using collision models to dynamically deploy safety measures "collaborative crashing."

Referring now to the drawings in general, and to FIG. 1 in particular, we show five components of the model-based system 100 for Collaborative Crashing. These components reside within the onboard computing facilities of the vehicles and may be actual physical components (hardware), logical components (software), or a combination (firmware). The components, though depicted in FIG. 1 as separate components, can be logical components within one device. For example, the functionality of the crash modeling component 130 and the functionality of the optimal crash sequence component 140 can reside within one component. Conversely, each component can include multiple subcomponents. For example, the imminent crash detection component 110 can include inter alia, multiple sensors, radar telemetry, and a timer.

The five main components of the collaborative crash system 100 are:

1) An "imminent crash" detection component 110;
2) A communicative coupling 120 between vehicles allowing for the exchange of information prior to and following the computation of a crash model;
3) A computational crash modeling component 130 capable of modeling a crash very quickly, based on the information exchanged, and optimizing the crash to the specifics of that information, to minimize injury to passengers and/or the vehicles;
4) A component 140 that exchanges the crash model's optimal crash sequence according to a crash planning protocol; and
5) A component 150 that executes the optimal crash sequence.

The specific capabilities of each component and candidate subcomponents are discussed here.

1) Crash Prediction—the Imminent Crash Detection Component 110.

When two or more vehicles 175 and 185 approach, sensors 112 in operative communication with each vehicle may detect the approach. The sensors 112 can be located on the vehicles themselves or placed at strategic locations on roadways. The sensed information used for crash prediction can include:

A) Presence of vehicle(s) sensed by sensors 112, radio telemetry, radar 114, and other technologies;
B) Speed and heading of vehicle(s), sensed by radar telemetry, or communicated directly and digitally; and
C) Rate of change of speed, sensed by radar telemetry or communicated directly and digitally.

2) Communicative Coupling Component 120.

Upon detection of an imminent crash, car A 175 and car B 185 form a rapid communicative coupling 120 to inform the other of the crash prediction. In addition, using standard protocols, the vehicles establish a parallel computing environment (see FIG. 5) for the exchange of information and for crash modeling. The coupling is essential for collaborative crash modeling.

3) Computational Crash Modeling Component 130. Crash modeling time-step iteration data are exchanged between vehicles 175 and 185, repeatedly modeling a crash with varying parameters to achieve an optimum plan collaboratively in the time remaining until the projected crash.

4) Optimal Crash Sequence Exchange Component 140. Based on the initial digital handshake, the vehicles agree to model together a specific number of time steps t into the future, and a specific number of optimization steps in which the time-step simulation is rerun with different parameters. The number of time steps simulated may be determined by vehicles arriving in the simulation to a pre determined velocity (for example, zero), or to a state in which the vehicles are no longer interacting with each other. Note that vehicles may include in their simulations information derived from other sources, such as road maps, on board or nearby traffic cameras, Google Street View™ data, weather conditions, etc. The results of each iteration and of each optimization step are then exchanged, ensuring that both vehicles share the most up to date projections and can rapidly collaborate on choosing optimal parameters for the final crash sequence.

5) Crash Sequence Implementation Component 150. Many parameters are used in modeling the crash. These parameters represent the state of the vehicle components. Some of the parameters are fixed and cannot be changed, such as the model, type, and weight of the vehicle; and the number and position of passengers. Other parameters, the free parameters, are those that can be modified to change crash outcomes in the time remaining. The modifications to vehicle parameters and their timing constitute a crash sequence and include:

A) Braking pattern across all four wheels. Changing this pattern and the relative anti-lock braking may allow vehicles to collide with subtle torque differentials around the yaw axis. This then can present different areas to absorb impact and minimize passenger injuries (such as unoccupied sides of the vehicle).

B) Steering direction. Changes to steering direction may have the same effects as changing the braking pattern.

C) Active suspension. Changes to suspension parameters may encourage roll and thus minimize impact energy for certain specific vehicle-vehicle combinations. Allowing vehicles to agree on which will "leap" and in which direction using suspension parameters is another possible means by which active suspension may be used to minimize injury.

D) Transmission. Changing the gear ratio prior to impact could allow engine displacement away from the main direction of impact and thus change the crash kinematics. This change would optimally be in opposite directions for each vehicle and thus would require collaborative agreement through modeling.

Figure 2:
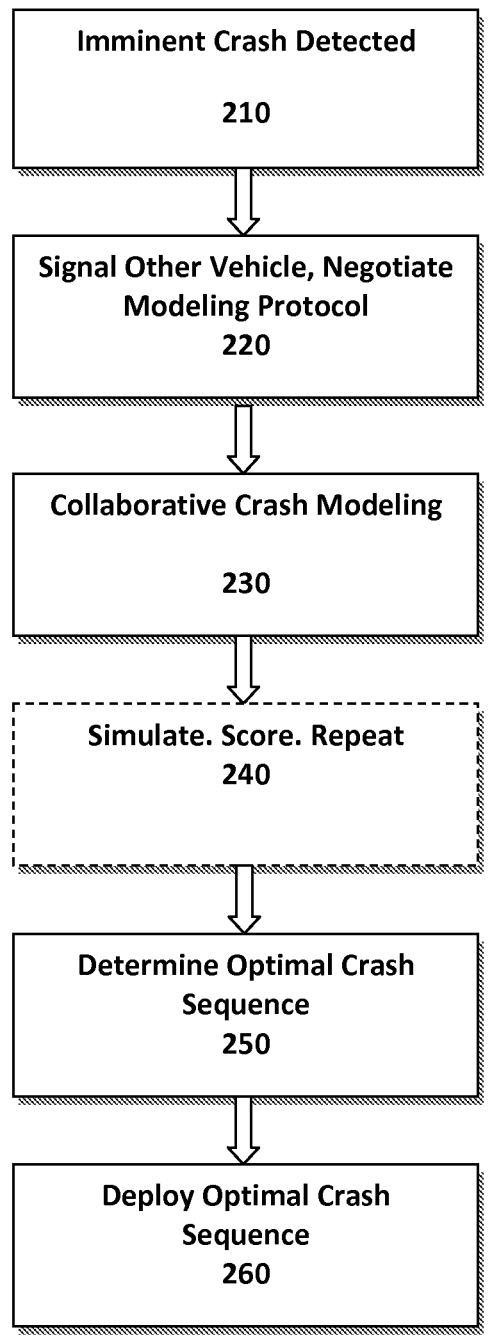
FIG. 2 is a high-level flowchart of the method for implementing the crash detection system, according to an embodiment of the present disclosure.

Referring now to FIG. 2 we show a flowchart 200 of the crash detection method according to an embodiment of the present disclosure. In step 210 the Imminent Crash Detection Component 110 of Car A 175 detects that a vehicle crash involving Car B 185 may be imminent. A crash is considered imminent upon reaching a criterion threshold of certainty. Typically this threshold of certainty represents detection of a condition where the vehicle's onboard crash avoidance systems determine no action is available to avoid a crash. This may include the determination that a braking system cannot dissipate the kinetic energy of the vehicle fast enough, given each vehicle's heading and speed, to avoid a crash by braking. Other determinations may be factored into the threshold of certainty.

Therefore, the problem a vehicle in the above situation aims to solve becomes that of optimization of the inevitable outcome, and simpler one-sided avoidance mechanisms must be discounted. Collaborative optimization may still determine that the crash can be avoided, for example, if vehicles agree to steer away from each other. However, the focus of this disclosure is on those conditions in which even collaborative optimization cannot avoid the crash (for example if steering cannot achieve avoidance in time before a crash). In these cases, optimization must instead focus on minimizing damage and injury due to an imminent crash. Once an imminent crash is detected, in step 220 Car A 175 signals Car B 185. Likewise, Car B 185 signals Car A 175 of the predicted crash.

Using standard protocols, the digital handshake between the two onboard computers establishes a parallel computing environment for the exchange of information and for crash modeling. The two vehicles negotiate a modeling protocol for modeling an optimal crash outcome. An optimal crash sequence is one in which the vehicle components that can be changed are modified by the crash modeling in such a way that damage and injury are reduced as much as possible.

In step 230 the crash is modeled collaboratively and repeatedly until an optimal crash sequence is agreed upon between the two (or more) vehicles in step 250. One method for determining an optimal crash sequence collaboratively would involve first vehicles agreeing on a time available to model the crash before an optimal crash sequence must be deployed. For example, in one scenario, the time available may be the time until vehicles are within three meters of each other (to allow various crash mitigating actions to have an effect).

Now, during this agreed upon interval, in step 240 vehicles perform time step simulations, wherein the simulations include candidate actions within a candidate optimal crash sequence. The candidate actions are differentially based on the actual implementation components in each vehicle. For example, one vehicle may have anti-lock brakes that would factor into the candidate actions for that vehicle. These candidate actions are communicated between vehicles as part of the information exchanged after each time step in the parallel simulation.

After each simulation the crash outcome is scored by each vehicle, and the simulation of the crash sequence is repeated, with certain actions altered, possibly with an attempt to optimize the crash sequence outcome based on an analysis of the results of the simulation. In scoring the simulated crash outcome model, each vehicle will attribute a higher ranking to those candidate actions that are most likely to mitigate injury to the driver and/or passengers in that vehicle. For example, a school bus full of children may rule out taking any actions to salvage the vehicle in favor of mitigating injury to the passengers. This may result in the school bus dismissing or scoring very low a simulation involving a side collision in favor of a head-on collision.

If, in the agreed upon interval, three simulations are performed, for example, the vehicles might decide among themselves to deploy the third crash sequence at the time the sequence must be deployed. The agreement on which sequence is best might involve an analysis of total injuries in both vehicles, or fewest fatalities, etc. Once the optimal crash sequence is determined in step 250, it is deployed in step 260 using the available implementation components in each vehicle. For example, Vehicle B 185 with three passengers in the back seat changes its braking pattern to avoid the greatest impact to the rear of the vehicle 185.

The computing facilities may be deployed in advance of anticipation of a crash, but may model possible crashes repeatedly as vehicles approach one another. In this way the system may enjoy greater computational utilization (less idle time) for the purpose of being more ready to model a crash which is actually deemed imminent. In addition, the system may employ a time-sharing strategy to model different crashes with different cars simultaneously, allocating more resources to those possible crashes that are more likely. The imminent crash detection is then the final stage of this time-sharing modeling approach, wherein all computer resources are devoted to modeling the imminent crash with other car(s).

Figure 3:
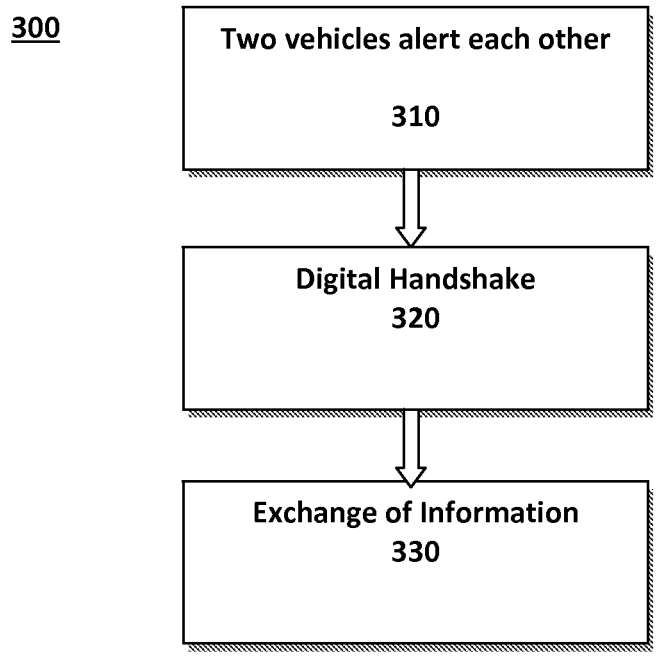
FIG. 3 is a lower-level flowchart of the method for crash detection, according to an embodiment of the present disclosure.

Referring now to FIG. 3 we show a lower-level flowchart 300 of step 220 from FIG. 2. First in step 310, the two vehicles 175 and 185 each alert the other that a crash is imminent. Next in step 320, the two vehicles rapidly engage in a digital handshake, wherein onboard modeling facilities are compared and an optimal parallel computing environment established according to compute speeds available and available communication bandwidth. A digital handshake defines a secure communication path for the quick and secure transfer of information between two devices.

Lastly, in step 330 vehicle information is exchanged between vehicles 175 and 185, including speed, heading, rate of acceleration/deceleration, vehicle mass, number, position, mass of passengers, onboard safety features (including air bags, seat belts in use, etc.). The vehicle information that is exchanged will be used as parameters computed in the crash simulation. These parameters will likely include fixed parameters such as onboard safety features and vehicle mass, and variable parameters such as the current speed of the vehicle. The fixed parameters need not be conveyed on every time step since they do not change from one simulation to the next. The variable parameters represent the variable simulation state of the vehicles.

Figure 4:
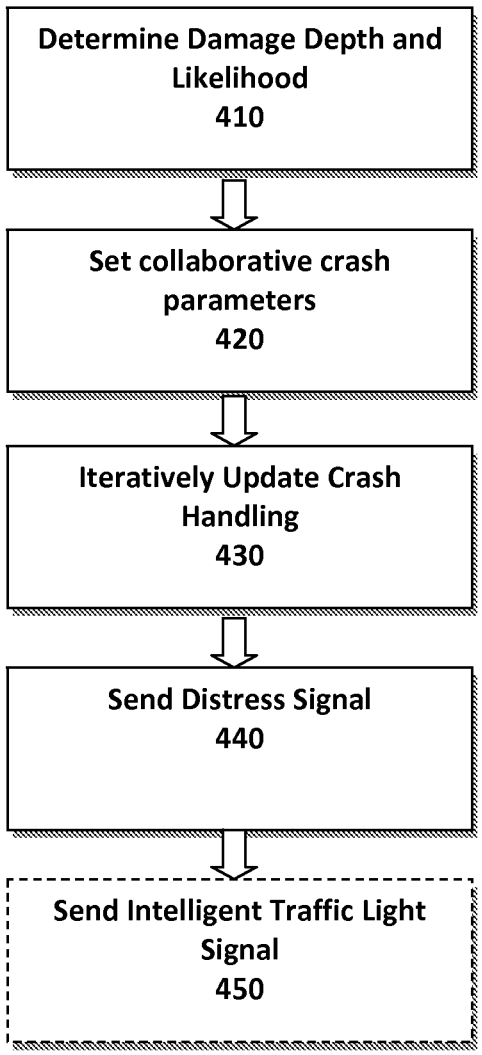
FIG. 4 is a high-level flowchart of additional implementation steps for the crash detection method of FIG. 2, according to an embodiment of the present disclosure.

In other embodiments of the present disclosure, additional novel factors may be considered and then used to adjust collaborative crashing to increase the likelihood of a crash that minimizes lives lost/damage to human beings, damage to cars, damaged to pedestrians, damage to property near an accident site, cost of damage to property (vehicles, property near an accident site, parked cars, etc.) and/or disruption to traffic. Referring now to FIG. 4, we show a flowchart of additional implementation steps for the crash detection method. In step 410, we determine damage depth and likelihood D (amount, cost, likelihood). The input to the D calculation may include any of:

a) landscape geography (e.g. slope of road, road material if known, history of accidents within radius R)

b) information on drivers (past history of driving and inferred ability to assist in optimizing and/or surviving a crash).

c) information on vehicles (vehicle type, features such as ABS (anti-lock brakes) or snow tires, transmission, all-wheel drive, value of vehicles, etc.)

d) information on nearby property (e.g. fire hydrants, gasoline pumps, electrical transformers, valuable property, etc)

e) information on pedestrians in the area (e.g. actual or predicted based on "business" of area at a time of day)

f) information on passengers in car (including weight of passengers, derived center of gravity for each passenger, use of seat belts, children in car seats, etc)

g) a computation of whiplash likelihood and severity for all passengers in all involved vehicles in real-time.

In step 420 we set collaborative crash parameters. These crash parameters can include factors that affect any of: braking, speed, direction of travel, gear, horsepower, deployment of supplemental restraints, deployment of airbags, traction control, activation of slight retraction of steering wheel or alteration in direction of steering wheel to minimize injury, a signal sent to traffic control lights within a radius R, the real-time deployment of road surface material (e.g., shooting of sand from dispensers at side of road to aid in traction).

In step 430 we iteratively update crash handling (e.g. many aspects are unpredictable until tried in icy situations). In step 440 an intelligent distress signal is sent during and/or after accident. The distress signal can contain such information as estimated amount of damage to people, vehicles, and/or property, as well as an estimate as to which vehicle occupants are in need of urgent help. The distress signal can be based on the anticipated state of the vehicle based on the simulation. Lastly, step 450 is an optional step of sending an intelligent traffic light signal.

The distress signal may contain such information on estimated amount of damage to people, vehicles, property, and an estimate as to which vehicle occupants are in need of the most help, etc., based on the prior simulation. Pre-emptive signaling is also possible once the crash sequence is determined, and the information of the possible outcomes of the crash may be relayed to emergency personnel, possibly even before the crash commences, using hardware that may eventually be destroyed in the crash. Similarly, a time-critical automatic, instantaneous and direct (dispatcherless) vehicle-to-vehicle, auto-routing Police/Emergency Medical Service vehicle, notification and response system can provide interactive and direct communication between a vehicle, non-vehicle, e.g. parked aircraft, property or individual in need of immediate emergency assistance, and the nearest (primary) mobile P/EMS vehicle that is available to respond to the exigency. Rapid notification and response is achieved by using a conventional Global Positioning System (GPS), a cellular phone optionally having positioning capability for transmitting the emergency signal, and a vehicle fleet management system (FMS). The latter is modified and designed to operate with a flawless vehicle theft and/or accident characterization technology. The central processing unit processes data from the GPS/FMS automatically and routes a distress call to a secondary or tertiary P/EMS vehicle, i.e., the next closes P/EMS emergency response.

Time Step Simulation Iterations Before Crash.

Figure 5:
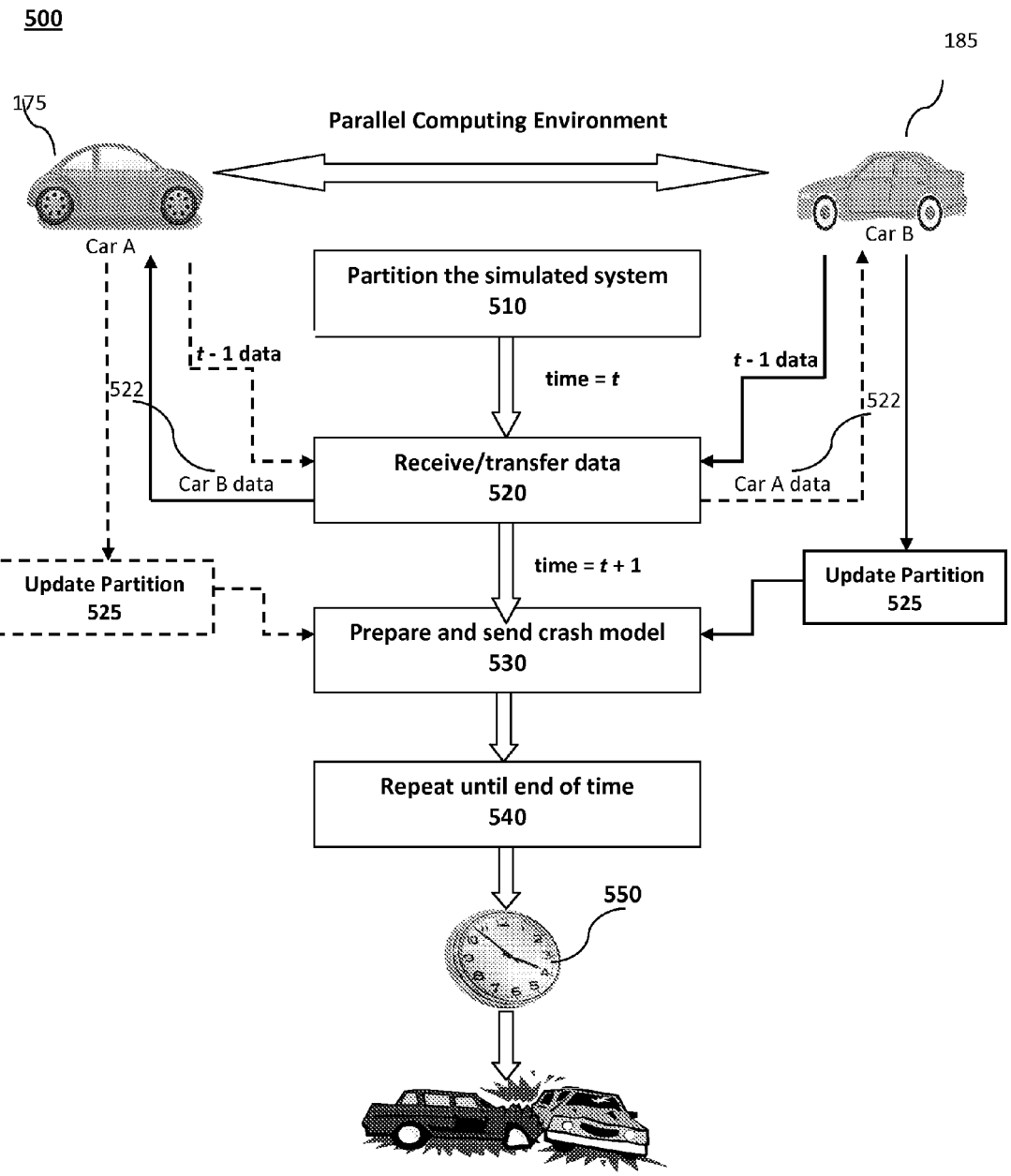
FIG. 5 is a flowchart 500 of the process for the parallel computation of a time step simulation of crash dynamics, according to an embodiment of the present disclosure.

Referring now to FIG. 5, we show a flowchart 500 of the process for parallel computation of time step simulation of crash dynamics, according to an embodiment of the present disclosure. In a parallel computing environment 100 for the purpose of modeling a crash, the time step t simulations performed on the parallel computing environment 100 are based on the premise that within a time step t, the computed state of model components depends only on the state of model components from the previous time step t−1. Some examples of parameters for model components are: vehicle speed, vehicle weight, vehicle direction, braking system, steering, transmission, suspension, traction and traction control, vehicle roll information. Model components which make use of these parameters are a model of the vehicle, its passengers, and its relationship in space to other objects in the environment (including the other vehicle).

In step 510 the parallel computing environment 100 partitions the simulated system between computing nodes; one partition per vehicle. Typically, a simulation will be partitioned such that each vehicle receives one partition that it must compute. A vehicle may partition this single partition further for its own computation of this partition (for example, if the vehicle has available to it an onboard parallel computing environment, such as a multi-core CPU). In step 520 the system 100 communicates between the computing nodes on time step boundaries all data computed for partitions from the previous time step t−1 which are needed by the other computing node to update their partitions (step 525) on a subsequent time step t+1. In other words, the t−1 data from Car A 175 is communicated to Car B 185, and vice versa. In this way a calculation may proceed much faster on a set of parallel computing nodes, each responsible for updating only their partition, than it would on a single node responsible for computing the entire system as a time step simulation.

The exchange of time step data 522 marshals the data into a message according to a standard marshalling protocol for vehicles implementing the Computational Crash Modeling Component 130. This protocol allows messages, when sent from one vehicle to a second vehicle, to be demarshalled into the computing environment of the second vehicle, such that computation of the second vehicle's partition of the simulation may proceed based on the communicated data. In this context, marshalling data means to convert the data into a serialized string that can be transmitted over a network. To demarshall the data is to reverse the process.

In a simple partitioning scheme, each vehicle is responsible for updating its own state in the simulation. Then, all data communicated between vehicles on each simulation time step boundary includes whatever is necessary for each to continue to update its simulation of the vehicle engaged in a crash. The data communicated between vehicles may include parameters such as: vehicle speed, vehicle weight, vehicle direction, braking system, steering, transmission, suspension, traction and traction control, vehicle roll information. In addition, the simulation may make use of data about vehicle crumple zones, composition, engine components and composition, and crash test data, in order to better model the transmission of energy between vehicles during the crash.

Note that the simulation may then include the effects of contingent updates to another vehicle's parameters computed on each time step, communicated only through standard interfaces. For example, a vehicle with a sophisticated braking system will update its momentum and heading direction according to a proprietary simulation of this sophisticated system, but only communicate to a second vehicle the necessary momentum and heading information, and not specific details of the braking system, which the other vehicle may not know about or have the ability to simulate. In this way, simulations may proceed in parallel between vehicles with different capabilities, from different systems, and implemented with different engineering standards, by different manufacturers, while still allowing each vehicle to arrive at a consistent, contingency-based simulation of the crash.

In step 530 with the updated information exchanged between both vehicles, the system prepares a crash model and sends it to each vehicle. The previous two steps of data transfer and updating the crash model are repeated until the agreed upon time has elapsed. In step 550 when it is determined that the agreed upon time has elapsed, the processing ends. At this point, just before impact, the vehicles 175 and 185 deploy the parameters of the latest or optimal updated crash model. In the case where the vehicles are able to optimize crash sequences with each subsequent simulation, the latest (most recent) crash model is deployed. In the event that vehicles performed a stochastic search of possible crash sequences, the best crash sequence is deployed. In some instances, vehicles may agree to deploy a hybrid crash sequence, when confidence is high it will be optimal among those simulated crash models, but where there is not sufficient time remaining to actually simulate it.

Because each simulation is contingent upon parameters set for proprietary systems on each vehicle dynamically during the time step simulation, the outcome of the simulation may not be optimal. Therefore, if time permits, subsequent simulations may adjust these parameters to attempt to improve crash outcomes. A stochastic search of parameters may then be performed collaboratively between vehicles over many simulations, and the optimal crash outcome selected.

Alternatively, if vehicles can cooperate in such a fashion, parameters may be updated cooperatively to perform a gradient ascent to the optimal crash parameters. Gradient ascent methods require that the landscape of outcomes is stationary while the optimization is performed. Therefore, vehicles may agree to take turns optimizing parameters for each vehicle while the other vehicle holds its parameters constant. Such an alternating, gradient ascent optimization, may provide better results than the simpler stochastic search.

On-Board Crash Modeling System.

Figure 6:
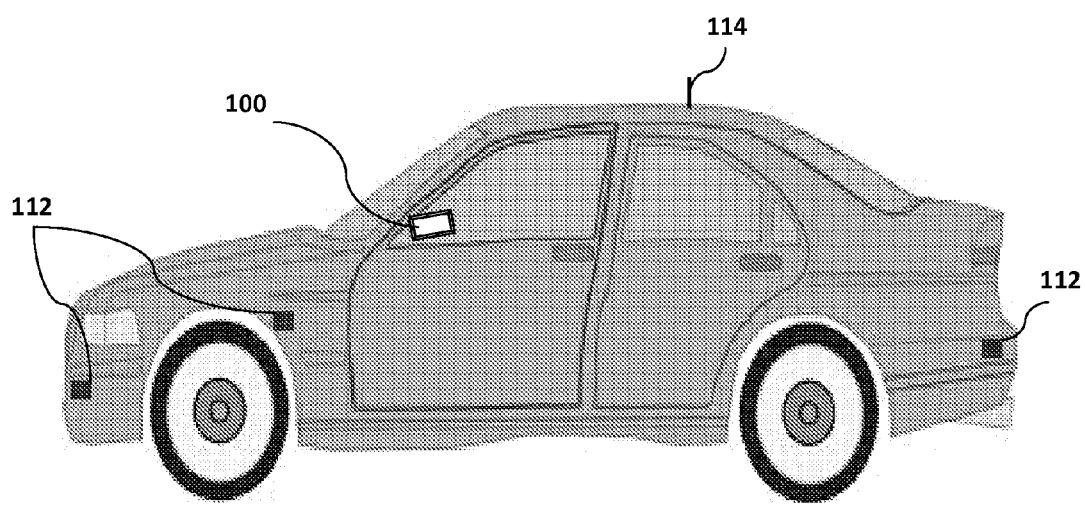
FIG. 6 is an illustration of a vehicle outfitted with a Collaborative Crash System, according to an embodiment of the present disclosure.

Referring now to FIG. 6, we show Car B 185 outfitted with the Collaborative Crash System 100. Car B includes multiple sensors 112. We define a sensor 112 as any device that converts real-world properties into data that a computer can process. For our purposes, we rely on sensors 112 that can measure the vehicle's acceleration and deceleration behavior, proximity to other vehicles, and other behaviors. Additionally, the sensors 112 can detect ambient conditions, such as the temperature and road conditions, both of which can affect tire performance. When an "event" occurs and an imminent crash needs to be minimized, the signal from the sensor 112 is processed by the Imminent Crash Detection Component 112. An onboard camera can also be a sensor 112 that provides data to the Crash Detection Component 112. A radar system 114 can also be used to provide data to the system 100. A report of the event is immediately generated, and sent to the Collaborative Crash System 100. The System 100, in turn, shares the information with the other involved vehicle(s) for collaborative crashing.

Predictive Crash Modeling.

Figure 7:
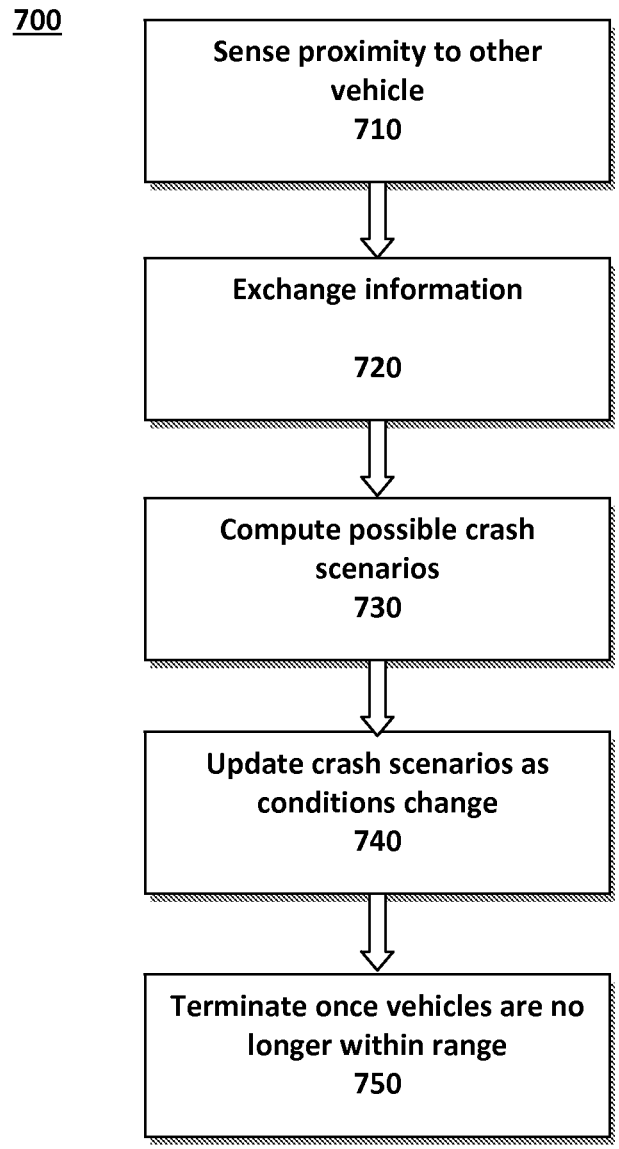
FIG. 7 is a high-level flowchart of a method for predictive crash modeling, according to another embodiment of the present disclosure.

According to another embodiment of the present disclosure, modeling of possible crashes occurs continuously with vehicles exchanging their locally created models with one another as they come into range, but prior to any imminent crash. Referring now to FIG. 7, we show a flowchart 700 of the method for predictive crash modeling, according to an embodiment of the present disclosure. In step 710, sensors 112 in car A 175 and car B 185 sense that they are within a predetermined range wherein a crash may occur, such as both cars approaching an intersection. In step 720 both vehicles exchange information that is required in order to generate a collaborative crash model.

In step 730 each vehicle computes possible crash scenarios prior to any imminent accident, using the exchanged collaborative crash model. As conditions change (such as rate of speed, distance) the locally computed scenarios are updated in step 740, thereby changing the optimal and possible actions. When a crash becomes imminent the processing required to compute scenarios is vastly reduced and a more optimal solution may be found prior to the expiration of available time. If the vehicles increase their distance from each other beyond the predetermined proximity range, the modeling stops in step 750.

Peer-assisted Crash Modeling.

Figure 8:
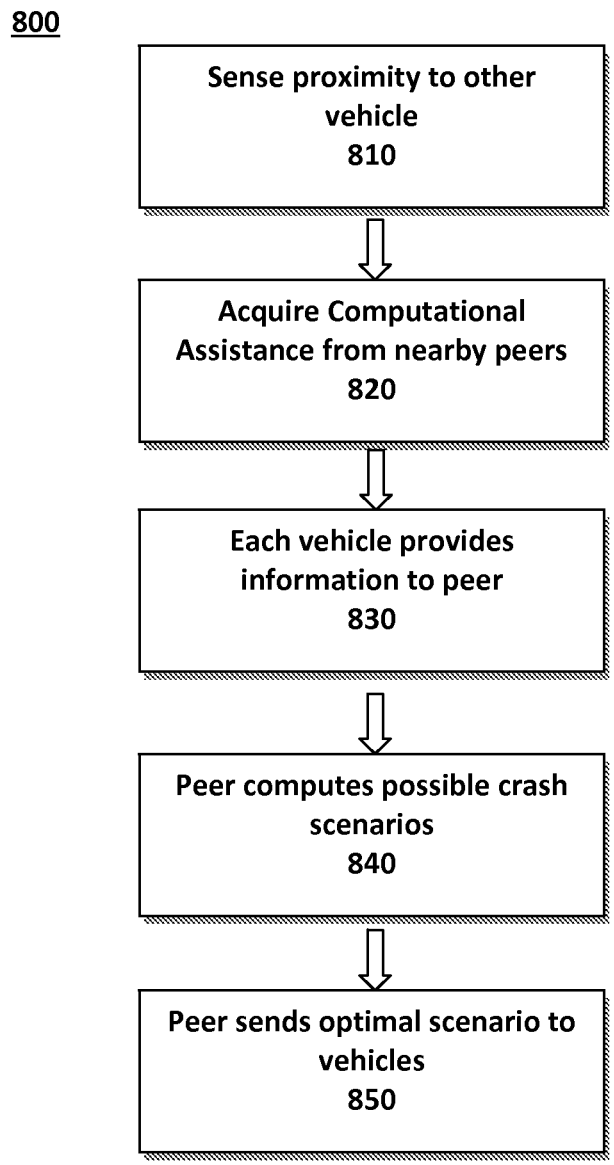
FIG. 8 is a high-level flowchart of a method for peer-assisted crash modeling, according to another embodiment of the present disclosure.

Referring to FIG. 8 we show a flowchart 800 of Peer-assisted Crash Modeling, according to another embodiment of the present disclosure. Peer-assisted Crash Modeling is similar to Predictive Crash Modeling, except that additional vehicles or other trusted or untrusted computer resources (e.g. mobile phones) volunteer to perform some of or all of the computational load of the modeling. In step 810, as in step 710 of FIG. 7, the process begins with Car A 175 sensing its proximity to Car B 185. In step 820 the two vehicles determine one or more nearby computing devices that can perform the computation of the crash modeling. Once the nearby peer device is acquired, each vehicle provides its information to the peer device in step 830. In step 840 the peer device computes possible crash scenarios with the information provided by the two vehicles. In step 850 the peer sends the optimal crash scenario to the vehicles.

Benefits and Advantages of the Disclosure.

A) Allows for a digital handshake between vehicles to establish a parallel computing crash modeling environment.

B) Allows for differential behaviors to be deployed by each vehicle to minimize overall passenger injuries.

C) Allows for passenger specifics to be taken into consideration in planning and executing a crash sequence, allowing, for example, positioning the vehicle such that unoccupied seats receive a greater impact than occupied seats or coordinating evasive maneuvers.

D) Allows for optimization strategies other than "every driver for himself," that is, where each driver takes evasive measures based only upon their own risk, without regard to the risk to the other vehicle's occupants.

Computer Program Product Embodiment.

The present disclosure may be embodied as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
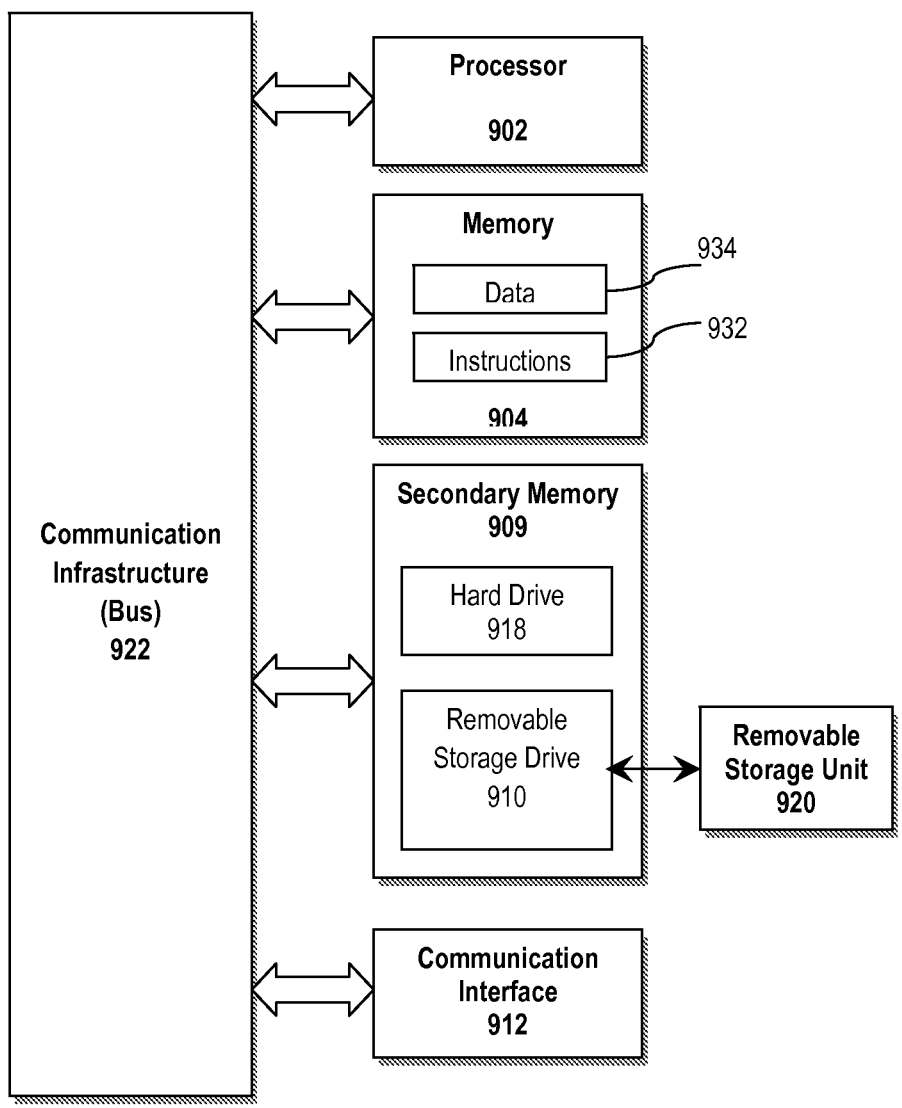
FIG. 9 is a high level block diagram showing an information processing system configured to operate according to an embodiment of the present disclosure.

Referring now to FIG. 9, there is provided a simplified pictorial illustration of the hardware components of the System 100 for collaborative crash planning, in which embodiments of the present disclosure may be implemented. For purposes of this disclosure, computer system 100 may represent any type of computer, information processing system or other programmable electronic device, including a client computer, a server computer, a portable computer, an embedded controller, a personal digital assistant, Cloud computing, Internet TV, and so on. The computer system 100 may be housed within a vehicle or may be remote from a vehicle.

Computer system 100, illustrated for exemplary purposes as a networked computing device, is in communication with other networked computing devices (not shown) via a network. As will be appreciated by those of ordinary skill in the art, the network may be embodied using conventional networking technologies and may include one or more of the following: local area networks, wide area networks, intranets, public Internet and the like.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks. However, for ease of understanding, aspects of the disclosure have been embodied in a single computing device—computer system 100.

Computer system 100 includes inter alia, processing device 902 which communicates with an input/output subsystem 906, memory 904, storage 910 and network. The processor device 902 is operably coupled with a communication infrastructure 922 (e.g., a communications bus, crossover bar, or network). The processor device 902 may be a general or special purpose microprocessor operating under control of computer program instructions 932 executed from memory 904 on program data 934. The processor 902 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 904 may be partitioned or otherwise mapped to reflect the boundaries of the various memory subcomponents. Memory 904 may include both volatile and persistent memory for the storage of: operational instructions 932 for execution by CPU 902, data registers, data from sensors 112, application storage and the like. Memory 904 preferably includes a combination of random access memory (RAM), read only memory (ROM) and persistent memory such as that provided by a hard disk drive 918. The computer instructions/applications that are stored in memory 904 are executed by processor 902. The computer instructions/applications 932 and program data 934 can also be stored in hard disk drive 918 for execution by processor device 902. Those skilled in the art will appreciate that the functionality implemented within the blocks illustrated in the diagram may be implemented as separate components or the functionality of several or all of the blocks may be implemented within a single component.

The computer system 100 can also include secondary memory 909 including a removable storage drive 910, representing a floppy disk drive, a magnetic tape drive, an optical disk drive, etc. The removable storage drive 910 reads from and/or writes to a removable storage unit 920 in a manner well known to those having ordinary skill in the art. Removable storage unit 920 is read by and written to by removable storage drive 910. As will be appreciated, the removable storage unit 920 includes a non-transitory computer readable medium having stored therein computer software and/or data, as previously stated.

The computer system 100 may also include a communications interface 912. Communications interface 912 allows software and data to be transferred between the computer system and external devices, such as telemetry devices. Examples of a communications interface 912 may include a modem, a network interface (such as an Ethernet card), a communications port, a PCMCIA slot and card, etc. Software and data transferred via communications interface 912 are in the form of signals which may be, for example, electronic, electromagnetic, optical, or other signals capable of being received by communications interface 912.

In this document, the terms "computer program medium," "computer usable medium," and "computer readable medium" are used to generally refer to non-transitory media such as main memory 904, removable storage drive 920, and a hard disk installed in hard disk drive 918. These computer program products are means for providing software to the computer system 100. The computer readable medium 920 allows the computer system 100 to read data, instructions, messages or message packets, and other computer readable information from the computer readable medium 920.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

The invention claimed is:

1. A method for real-time crash modeling, comprising:
using a processor device operatively coupled with at least one sensor in a parallel computing environment, performing:
deriving a likelihood of an impact occurring between a first vehicle and a second vehicle;
negotiating a crash modeling protocol between the first and the second vehicle by partitioning the parallel computing environment into partitions between computing nodes representing the first and second vehicles, each partition comprising the variable simulation state for its associated vehicle; and
determining an optimal crash sequence that minimizes possible injury and damage by iteratively performing the following within time step boundaries:
exchanging information with the first and second vehicles according to the crash modeling protocol, said information comprising a variable simulation state of each vehicle indicating a state of collaborative crash parameters;
collaboratively computing a crash model prior to the impact, using the exchanged information, said crash model comprising differential actions for each vehicle to take in order to minimize injury and damage; and
exchanging the computed crash model.

2. The method of claim 1 further comprising deploying the optimal crash sequence by making requisite changes to the collaborative crash parameters, as provided by the crash model, in order to minimize the possible injury and damage.

3. The method of claim 1 wherein negotiating the crash modeling protocol further comprises:
defining a secure communication path for quick and secure transfer of information;
comparing onboard modeling facilities;
setting the collaborative crash parameters;
determining a time before impact; and
determining a number of time steps before impact.

4. The method of claim 3 wherein exchanging the information with the first and second vehicles comprises determining the possible injury and damage depth and likelihood as a function of at least one factor selected from a group consisting of: landscape geography, inferred driver ability, vehicle data, local property data, local pedestrian data, vehicle passenger data, and whiplash likelihood and severity.

5. The method of claim 4 wherein collaboratively computing the crash model comprises:
receiving from the computing nodes on time step boundaries the variable simulation state from a previous time step;
wherein each computing node updates the variable simulation state in its partition according to the state of the collaborative crash parameters from the previous time step, such that the crash model includes effects of a contingent update to the one of the first and second vehicles' variable simulation state computed on a time step.

6. The method of claim 3 wherein setting the collaborative crash parameters comprises selecting parameters from a group consisting of: braking, speed, direction of travel, gear, horsepower, deployment of supplemental restraints, airbag deployment, traction control, activation of retraction of steering wheel, alteration in direction of steering wheel, sending a signal to traffic control lights within a radius R, and a real-time deployment of road surface material.

7. The method of claim 3 wherein determining the optimal crash sequence is performed by the computing node of the first vehicle.

8. The method of claim 3 wherein determining the optimal crash sequence is performed by a peer device in communication with the two vehicles.

9. The method of claim 4 wherein exchanging the information with the first and second vehicles comprises performing an alternating gradient ascent to optimal crash parameters such that the computing nodes take turns updating the variable simulation state for each vehicle while the other computing node holds its variable simulation state constant.

10. An information processing system for real-time crash modeling, comprising:
   a processor device operatively coupled with at least one sensor; and
   a memory operably coupled with the processor device and having computer-executable instructions stored thereon, said computer-executable instructions comprising:
      deriving a likelihood of an impact occurring between a first vehicle and a second vehicle;
      negotiating a crash modeling protocol between the first and the second vehicle by partitioning the parallel computing environment into partitions between computing nodes representing the first and second vehicles, each partition comprising the variable simulation state for its associated vehicle; and
      determining an optimal crash sequence that minimizes possible injury and damage by iteratively performing the following within time step boundaries:
         exchanging information with the first and second vehicles according to the crash modeling protocol, said information comprising a variable simulation state of each vehicle indicating a state of collaborative crash parameters;
         collaboratively computing a crash model prior to the impact, using the exchanged information, said crash model comprising differential actions for each vehicle to take in order to minimize injury and damage; and
         exchanging the computed crash model.

11. The information processing system of claim 10 wherein the computer-executable instructions for negotiating the crash modeling protocol further comprise:
   defining a secure communication path for quick and secure transfer of information;
   comparing onboard modeling facilities;
   setting the collaborative crash parameters;
   determining a time before impact; and
   determining a number of time steps before impact.

12. The information processing system of claim 11 wherein exchanging the information with the first and second vehicles comprises determining the possible injury and damage depth and likelihood as a function of at least one factor selected from a group consisting of: landscape geography, inferred driver ability, vehicle data, local property data, local pedestrian data, vehicle passenger data, and whiplash likelihood and severity.

13. The information processing system of claim 11 wherein the computer-executable instructions for collaboratively computing the crash model comprise:
   receiving from the computing nodes on time step boundaries the variable simulation state from a previous time step;
   wherein each computing node updates the variable simulation state in its partition according to the state of the collaborative crash parameters from the previous time step, such that the crash model includes effects of a contingent update to the one of the first and second vehicles' variable simulation state computed on a time step.

14. The information processing system of claim 11 wherein the collaborative crash parameters are selected from a group consisting of: braking, speed, direction of travel, gear, horsepower, deployment of supplemental restraints, airbag deployment, traction control, activation of retraction of steering wheel, alteration in direction of steering wheel, sending a signal to traffic control lights within a radius R, and a real-time deployment of road surface material.

15. The information processing system of claim 10 further comprising a peer device in communication with the vehicles, said peer device performing the optimal crash sequence.

16. A computer program product comprising a non-transitory computer-readable storage medium with computer-executable instruction stored therein, said computer-executable instructions performing real-time crash modeling by causing a computer to perform:
   deriving a likelihood of an impact occurring between a first vehicle and a second vehicle;
   negotiating a crash modeling protocol between the first and the second vehicle by partitioning the parallel computing environment into partitions between computing nodes representing the first and second vehicles, each partition comprising the variable simulation state for its associated vehicle; and
   determining an optimal crash sequence that minimizes possible injury and damage by iteratively performing the following within time step boundaries:
      exchanging information with the first and second vehicles according to the crash modeling protocol, said information comprising a variable simulation state of each vehicle indicating a state of collaborative crash parameters;
      collaboratively computing a crash model prior to the impact, using the exchanged information, said crash model comprising differential actions for each vehicle to take in order to minimize injury and damage; and
      exchanging the computed crash model.

17. The computer program product of claim 16 wherein the computer-executable instructions for negotiating the crash modeling protocol further comprise:
   defining a secure communication path for quick and secure transfer of information;
   comparing onboard modeling facilities;
   setting the collaborative crash parameters;
   determining a time before impact; and
   determining a number of time steps before impact.

18. The computer program product of claim 17 wherein the computer-executable instructions for collaboratively computing the crash model comprise:
   receiving from the computing nodes on time step boundaries the variable simulation state from a previous time step;
   wherein each computing node updates the variable simulation state in its partition according to the state of the collaborative crash parameters from the previous time step, such that the crash model includes effects of a contingent update to the one of the first and second vehicles' variable simulation state computed on a time step.

19. The computer program product of claim 16, wherein exchanging the information with the first and second vehicles comprises determining the possible injury and damage depth and likelihood as a function of at least one factor selected from a group consisting of: landscape geography, inferred driver ability, vehicle data, local property data, local pedestrian data, vehicle passenger data, and whiplash likelihood and severity.

20. The computer program product of claim 18 wherein the collaborative crash parameters are selected from a group consisting of: braking, speed, direction of travel, gear, horsepower, deployment of supplemental restraints, airbag deployment, traction control, activation of retraction of steering wheel, alteration in direction of steering wheel, sending a signal to traffic control lights within a radius R, and a real-time deployment of road surface material.

* * * * *